United States Patent

[11] 3,608,063

| [72] | Inventor | Gilbert S. Banker<br>School of Pharmacy, Purdue University,<br>Lafayette, Ind. 47907 |
|---|---|---|
| [21] | Appl. No. | 850,664 |
| [22] | Filed | Aug. 15, 1969 |
| [45] | Patented | Sept. 21, 1971<br>Continuation-in-part of application Ser. No. 757,142, Sept. 3, 1968. |

[54] MOLECULAR DRUG ENTRAPMENT PROCESS AND COMPOSITIONS
10 Claims, No Drawings

[52] U.S. Cl. .................................................... 424/22,
424/19, 424/32, 424/33, 424/78, 424/81
[51] Int. Cl. ................................................... A61k 27/12
[50] Field of Search ............................................ 424/19, 22,
78, 79, 81

[56] References Cited
UNITED STATES PATENTS

| 2,906,665 | 9/1959 | Doyle | 424/180 X |
| 2,990,332 | 6/1961 | Keating | 424/79 |
| 3,066,075 | 11/1962 | Deutsch | 424/180 X |
| 3,121,043 | 2/1964 | Tobin et al. | 424/81 X |
| 3,158,538 | 11/1964 | Lee | 424/79 |
| 3,214,341 | 10/1965 | Feinstone | 424/362 |
| 3,328,256 | 6/1967 | Gaunt | 424/19 |
| 3,346,449 | 10/1967 | Magid | 424/81 |
| 3,449,489 | 6/1969 | Gaunt | 424/31 |

Primary Examiner—Shep K. Rose
Attorneys—Donald C. Simpson, Carl A. Castellan and George W. F. Simmons ABSTRACT: Pharmaceutical compositions are prepared by combining in the presence of water and a carboxylic acid a polymer having acidic or basic functionality with a pharmaceutically active material having respectively basic or acidic functionality, coagulating or otherwise separating the product produced and then formulating the product by conventional techniques into suitable dosage forms. The resulting products are characterized by possessing unique sustained-release, enteric or delayed-release properties.

MOLECULAR DRUG ENTRAPMENT PROCESS AND COMPOSITIONS

This application is a continuation-in-part of pending U.S. Pat. application Ser. No. 757,142, filed Sept. 3, 1968.

This invention relates to polymer emulsion compositions and is more particularly related to new and improved pharmaceutical compositions having controlled release including, but not limited to, sustained-release, enteric or delayed-release properties and to methods of preparation of these compositions. By controlled release the rate of dissolution and availability of the drug may be regulated so that the quantity of drug which is released at a particular time or a particular site is enhanced.

Heretofore, a variety of techniques have been used to provide protective coverings for drugs so as to impart sustained release or controlled release or to make oral administration more palatable or even feasible. These prior art pharmaceutical preparation methods include encapsulating the drug, coating granules or tablets of drugs with films of suitable materials, combining the drug with an ion-exchange resin, chemically combining a basic drug in an acidic polymer gel or physically entrapping the drug in a polymer matrix. The very variety of available processes itself illustrates both the range of problems posed in formulating pharmaceutically active materials and the need for improved processes offering greater control, flexibility and economy.

Many drugs used in oral liquid dosage forms, such as cough preparations, including solutions, syrups, or suspensions, are absorbed at an uncontrolled, nonoptional rate in the human system and the administration thereof is made difficult, unpleasant, and potentially more dangerous than is necessary. The incidence of undesirable side effects such as nausea, dizziness, visual disturbances or profuse sweating accompany many drugs, particularly when rapid adsorption produces high peak blood levels which touch the toxic range. With such oral preparations, some drugs produce a bitter taste or numbing of the tongue and surrounding mucous membranes. These side effects make these prior art oral pharmaceutical preparations very unpalatable, unpleasant, occasionally toxic and more hazardous than necessary. By inhibiting release or by providing gradual release of the drug at absorption sites, (a) undesirable peaking of blood levels is reduced and drug safety may be improved, (b) drug dissolution may be retarded until the drug has passed sites of high acidity where the drug is more prone to decomposition, (c) drug release may be retarded to avoid irritation in the stomach, or an emetic effect due to drug dissolution in the stomach, or (d) drug release may be delayed to make the drug available at desirable sites of absorption at a high drug concentration for improved absorption.

By employment of the present invention the aforementioned problems and difficulties of the prior art, among others, are substantially overcome by the provision of new and improved methods. Compositions prepared by the methods of the invention may have sustained, enteric, delayed or controlled release properties. The methods and compositions of the present invention, in production, are markedly less expensive than the methods and compositions of the prior art; the necessity for expensive coating apparatus and skilled coating personnel is eliminated, and the adaptability of the methods of the present invention permit their application to all classes of drugs characterized by a basic or acidic group in the drug moiety as described in more detail hereinafter.

Moreover, the present invention is adaptable to use of what is known in the art as "bridging moieties" to promote sorption of cationic drug moieties and to facilitate sorption of anionic or amphoteric drugs. Pharmaceutical compositions prepared in accordance with the present invention may advantageously be adapted for oral administration in oral dosage forms, e.g., in tablet, capsule, powder or a suspension of powders in a liquid vehicle.

The methods and compositions of the present invention have a further advantage in that they are also adaptable to produce enteric, delayed-release, sustained-release or controlled-release pharmaceutical compositions, in either solid or liquid preparation dosage form, which have been found, in some instances, to be more stable than standard organic or inorganic salts of the same drugs when these compositions are prepared with the conventional drug salts.

The novel methods of the present invention result, not only in compositions which can be employed in liquid sustained or controlled release form, but may also result in pharmaceutical products having slower absorption rates and which in oral dosage form are practically free of any bitter taste or numbing effects. The methods of the present invention are uniquely suitable in preparing accurate dosage units of highly potent drugs, since the methods are characterized by their molecular or ionic scale sorption-mixability capability.

These and other objects, features and advantages of the present invention will become readily apparent from a careful consideration of the following detailed description and illustrative examples.

GENERAL DISCUSSION

In the process of the invention an aqueous latex of polymer having acidic and/or basic groups is contacted with a pharmaceutically active material (hereinafter called a "drug") having basic and/or acidic groups in the presence of a carboxylic acid. In a preferred embodiment, the water is then removed and the product formulated into a suitable dosage form.

It is believed that the drug molecules are chemically or physicochemically bonded to the polymer chains. In addition, the extremely high surface area presented by the polymer due to the colloidal size of the polymer particles is believed to result in the adsorption of drug molecules on the surface of the polymer particles. Carboxylic acids have been found to promote sorption of drug during the process by which the drug is trapped, as well as to provide a further mechanism by which subsequent drug release may be controlled. The acids may act as counter or protective ions, retarding polymer flocculation or coagulation and/or as bridging moieties, facilitating surface sorption of drug to polymer.

As stated, the polymers used in the invention are in an aqueous latex. By "latex" is meant an aqueous dispersion of colloidal or near-colloidal polymer particles. Conventionally a polymer latex is produced by emulsion polymerization and will have particle sizes in the micron and submicron range. Minor amounts of organic liquids, such as lower alkanols, which do not interfere with the polymer-drug reaction may be present during the reaction. If the polymer contains both basic and acidic groups, it may be used to react with basic drugs or acidic drugs, and if the drug is both acidic and basic, the polymer may be either basic or acidic. However, where the polymer contains only acidic groups, the drug must contain basic groups for chemisorption to occur although limited physical adsorption may exist. Similarly, where the polymer is basic, the drug should be acidic except that where the added carboxylic acid is a polycarboxylic acid, e.g., a dicarboxylic acid, both polymer and drug can be basic.

As an additional means of controlling drug release, drugs either may be entrapped in the presence of a soluble diluent component, or the soluble diluent may be added later in milling the dry polymer-drug product with the soluble component serving to facilitate and accelerate subsequent drug dissolution release. Suitable excipients include, for example, mannitol, lactose, urea, sorbitol, polyoxyethylene glycols, sodium chloride, etc.

The methods of the invention are highly reproducible, stoichiometric techniques for drug entrapment in which the level of entrapment, as well as the uniformity and degree of drug dispersion, may approach or may equal molecular scale.

POLYMERS

The polymers useful in the present invention are widely available commercially. Generally, these polymers are produced by conventional emulsion polymerization and contain one or more monomers having either basic or acidic groups. Suitable acidic groups include for example carboxylate, sulfonate, and phosphonate. Suitable monomers embodying these acidic radicals include acrylic acid, methacrylic acid, crotonic acid, itaconic acid, maleic acid, half-esters of maleic acid, maleic anhydride, sulfonated styrene, phosphonated styrene, etc. Suitable monomers containing basic functionality include for example polyvinyl amine, the aminoalkyl esters of any of the aforesaid acids such as aminoethyl methacrylate, etc. These monomers are copolymerized with any other copolymerizable monomer so long as the resulting polymer does not produce any adverse physiological reaction. Polymers useful in the invention include for example, those produced by copolymerizing one or more of the above acidic or basic monomers with vinyl acetate, vinyl propionate, vinyl ethers, hydroxyethyl methacrylate, acrylonitrile, ethylene, styrene, vinyl chloride and one or more alkyl acrylate or methacrylate monomers.

The maximum amount of acid in the copolymer is determined by the solubility characteristic of the overall copolymer composition, i.e., above a certain acid level it is not possible to form a latex. This level varies with the nature of the acid and of the other monomers. Thus, methacrylic acid could be present in up to about 75 percent by weight when copolymerized with other monomers of median hydrophobic properties such as the lower alkyl esters of acrylic and methacrylic acid, while slightly more acid could be used of the other monomers were strongly hydrophobic, such as styrene. Conversely, the maximum acid level would be lower for acids which are move strongly hydrophilic than methacrylic acid, such as maleic acid, acrylic acid, etc. The presence of nonionic hydrophilic groups, such as ether linkages, hydroxy groups, etc., will also act to lower the maximum acid level.

The minimum acid level in the copolymer is determined both by the ability of the polymer to entrap a reasonable amount of drug and by the ability of the polymer to be hydrated, e.g., swelled or even dissolved by digestive fluids either in the stomach (acid pH) or the small intestine (slightly basic pH). The swelling need not be great. The polymer contains sufficient acid content if a dried powder produced from the polymer approximately doubles in size in stomach or intestinal fluid at 37° C. This action assists the dispersion of the drug making it available to the body more readily than would be the case if the polymer were inert to the digestive fluid. This is important in the polymer-drug products of the invention due to the molecular scale of entrapment as opposed to the channels of drug created when dry polymer and drug are mixed and tabletted. Again the minimum amount of acid will vary with the nature of the acid and of the other monomers. Thus, for copolymers of methacrylic acid with monomers of median hydrophobic properties as defined above, about 10 percent acid is suitably present. More hydrophobic comonomers would require a higher acid content, while more hydrophilic comonomers (such as nonionic solubilizing groups) or more hydrophilic acids (acrylic, maleic, etc.) would permit the use of lower acid contents.

The latices found useful in the practice of the present invention are polymer products made by an emulsion process which are colloidal dispersions of polymer, and are usually marketed as 20 to 60 percent solid dispersions, by weight. The latices of dispersed colloid of the polymer emulsions useful in the practice of the present invention present a highly concentrated dispersed polymer system of high molecular weight material, which is impossible to match in high concentration in solution due to solubility and viscosity limitations. For example, it has been estimated that such a typical polymer emulsion contains in the order of $10^{14}$ or 100 trillion polymer particles per cubic centimeter or dispersion.

Because of their ready commercial availability and suitable physical form, it is preferred to use polymers produced by emulsion polymerization. Polymer dispersions produced by alternate processes may be used. For example, copolymers may be produced by nonaqueous dispersion polymerization and the organic phase is then replaced with water. These and other polymerization techniques are well known to those skilled in the art and do not constitute the invention.

DRUGS

As aforesaid, the methods of the present invention may be applied to all classes of drugs having acidic and/or basic groups. Where the drug contains a basic nitrogen group, the drug may be used in the invention either as the free amine or as a salt as, for example, a hydrochloride or sulfate.

Basic drugs include, for example, dextroamphetamine, racemic amphetamine, d-desoxyephedrin, chlorpromazine, prochlorperazine, trifluoperazine, methapyrilene, diphenylhydramine, chlorprophenpyramidamine, chlorpheniramine, codeine, atropine, reserpine, strychnine, phenylephrine, phenazocine, pilocarpine, morphine, homatropine, ephedrine, dihydrocodeinone, pyrilamine and the like. Amphoteric drugs may also be used and include, for example, penicillins and their salts, cephalosporins and their salts and derivatives. Acidic drugs useful in the invention include, for example, the barbiturates, aspirin, etc.

The great majority of drugs—perhaps as many as 90 percent—contain basic functionality. Accordingly, the invention will be described in terms of a basic drug and an acidic polymer, but it should be understood that it is equally applicable to a basic polymer with an acidic drug as described above.

ACIDS

The acids useful in the present invention comprise monocarboxylic acids as well as polycarboxylic acids provided they are sufficiently soluble in the reaction system to form salts with the drugs. Even acids which are only slightly water-soluble can be used since as dissolved acid is used up in the reaction, more will go into solution. Typical useful monocarboxylic acids are acetic acid and aminoacetic acid (glycine). Useful polycarboxylic acids include saturated aliphatic acids such as oxalic acid, malonic acid, succinic acid, glutaric acid and adipic acid; unsaturated aliphatic acids such as maleic acid and fumaric acid; hydroxy acids such as citric acid and tartaric acid; acids of a more complex functionality such as ascorbic acid; and carbocylic acids such as the phthalic acids.

The carboxylic acid additives can be added directly to the polymer-drug system or can be preacted and added as a carboxylate. Thus, the acid can be mixed with a solution of drug hydrochloride salt and polymer ordered thereto and flocculated. Alternatively, the acid can be added to a solution of the drug and reacted therewith, and the drug-acid carboxylate crystallized from solution; typically, the carboxylates are recrystallized from one to three times from an isopropanol/ether solution, and vacuum dried. The crystallized carboxylates are then mixed in solution with the polymers for the sorption-flocculation step. In general, the acid and drug are mixed and/or reacted in approximately equimolar concentratives (as in the examples, unless otherwise indicated). However, the carboxylic acid, e.g., a dicarboxylic acid, may be added in less than equimolar concentration by the resulting sorption increase will be something less than the possible maximum, albeit, greater than if no carboxylic acid were utilized.

REACTION

The choice of a process by which the drug, acid and polymer are contacted to interact to produce the sustained release, delayed release, controlled release or enteric final composition is highly flexible and includes pipeline mixing, countercurrent mixing of opposing fluid streams, jetstream mixing (i.e., jetstream injection of one liquid phase into the other or a countercurrent stream of the other), tank mixing, or any related fluid mixing operation. Also it has been found that whether such mixing is high shear or low shear, during the sorption and trapping process, and whether the rate or admixture of one component with the other is high or low, has little general effect on the sorption and entrapment process. Where maximum drug sorption is desirable, it has been found advisable to add the drug and acid in solution to the polymer emulsion. It is not essential for the drug or drug salt to be completely soluble in the aqueous phase, but only to furnish a higher concentration of ions than the polymer-drug reaction product. Where the drug or drug salt is only partly soluble, the ions in solution react with the polymer. As the reaction removes ions from solution, additional drug dissolves until the reaction is complete. The drug and polymer need not be reacted in stoichiometric proportions. Thus an amount of drug over and above that which can react with the polymer may be used. The presence of such a drug fraction in compositions of the present invention, which is physically and mechanically entrapped, i.e., which is not chemisorbed to the polymer, and which is not, in general, involved in the ionic charge dissipation of the polymer emulsion to bring about coagulation of the emulsion, may be utilized to:

1. Increase the overall rate of drug release, if such physically and mechanically entrapped drug has good solubility properties in the upper gastrointestinal tract,
2. Decrease the overall rate of drug release from the final composition, if the mechanically entrapped fraction does not have good solubility properties in the upper gastrointestinal tract, or,
3. Permit use of a drug which is in a form which can only be mechanically entrapped to be combined in this process along with the same or a different drug which can be molecularly trapped, to increase the overall drug concentration of the final composition to above 60 percent, which is the usual upper limit of drug concentration which can be obtained by molecular scale sorption of drug from a solution, or to permit useful combinations of drugs, each with its own designed controlled-release rate.

The addition of a drug or drug salt which is not in solution or which cannot go into solution readily in the polymer emulsion or in a solvent which is miscible with the polymer emulsion and which cannot be trapped other than by mechanical means is not usually a primary goal of this invention, since such entrapment would be less uniform and reliable than the main feature of this invention, i.e., molecular to ionic scale drug sorption from solution. However, the combination of molecular scale drug sorption and gross physical scale entrapment may also be employed in the practice or the present invention to produce unique products.

In one preferred embodiment of the invention, the drug is added to a considerably excess of the polymer. Certain drugs must be administered in highly accurate unit doses each containing only a few micrograms of drug. Too little of such a drug in each dose unit might result in failure to treat the disease while an excess of drug over the desired amount may lead to a greater incidence of unwanted side effects or to direct acute toxicity. Also where the difference between an effective dose and a toxic dose is slight, extreme precision in formulation is essential. Present techniques of mechanically blending finely ground powders obviously present problems in accurately controlling the level of active ingredient in each unit dose. Variables include the particle size to which the drug has been reduced, the relative particle size distributions of drug and polymer and the uniformity of particle-particle mixing. The present invention permits easy and precise control of drug dispersion and much more uniform drug distribution which is predicated on physicochemical principles rather than mechanical factors. This is accomplished by contacting an aqueous solution of the drug and acid with a considerable excess of polymer. The drug, being in solution, will be distributed throughout the emulsion as separate molecules or ions which statistically will be randomly distributed throughout the polymer. Thus, instead of dividing 1 gram of drug into 100,000 approximately equal particles by fine milling, the present invention permits highly uniform distribution of the drug as $6\times10^{23}$ molecules/mole throughout the polymer, e.g., at a level of 1 gram of drug per kilogram of polymer, thus simplifying the problem for the formulator, greatly improving the reliability of mixing, and reducing the mass of dispersed drug by many orders of magnitude. A typical drug with a molecular weight of 300 would produce $2\times10^{21}$ molecules or ions for every gram in solution as compared to $1\times10^{5}$ to $1\times10^{7}$ milled particles per gram.

As previously stated, the drug may most commonly be entrapped at a molecular scale level when combined with the polymer emulsion as an aqueous or primarily aqueous solution of the drug salt. However, in come cases, it may be more convenient to combine the drug in its free base or acid nonsalt form and the free carboxylic acid with the polymer emulsion, the free base being added as an aqueous solution, organic solvent solution or aqueous dispersion. If the drug base is slightly soluble, as in phenylpropanolamine, the drug as an aqueous solution may be combined with the polymer emulsion. Most cationic drugs in free base form or anionic drugs in acid form are water insoluble, and may be added to the polymer emulsion directly as the oily liquid or insoluble powder-free base or acid forms, or as a dispersion of the free base or acid in an aqueous media, or as a solution of the free base or acid in an organic solvent which does not interfere with the drug-polymer reaction. As previously described, the most advantageous form of addition is frequently for the drug to be in its maximally disposed form, i.e., in solution.

Since the pH of the most physically stable polymer emulsions containing a polymer with an acidic functional group is prominently acidic, a drug base which is combined with such polymer emulsions will be converted, at least in part, to the drug salt form, (ionized species), and will be indistinguishable, as to process result of final composition characteristics, from the process result or final composition characteristics of adding the drug salt initially in solution. Of course, it will be appreciated that substantial conversion of the drug base to the ionized species must occur before coagulation of the polymer dispersion is completed.

The aqueous solution or dispersion produced by contacting the drug and polymer as described may be used in such for formulating a pharmaceutical composition, as by adjusting the pH, adding coloring and/or flavoring agents, etc. It is preferred, however, to separate the reaction product from the liquid phase and then formulate the product into a tablet, powder or similar pharmaceutical composition using conventional procedures and compounding ingredients. Where the product is itself insoluble, it may be readily separated by filtration, centrifugation, etc. Other procedures for separating the drug-polymer product involve coagulation as by the addition of a suitable electrolyte or polymer of suitable electric charge, followed by filtration or centrifugation; spray drying; freeze drying; vacuum evaporation, etc.

The techniques of addition of a nondrug electrolyte to accelerate the coagulation process may be preferably employed either where low quantity levels of drugs are being entrapped (10 percent or less and usually 2 percent or less drug in final dry polymer-drug product) which will not in and by themselves reach the requisite flocculation value of the polymer emulsion, or where complete drug sorption is not desirable due to the desire to avoid an excessively retarded drug release. The flocculation value (concentration of ion required to produce visable coagulation following some specified time interval, usually 5 or 10 minutes), for a given ion, varies widely for different anionic or cationic polymer emulsions. Factors involved include intensity or charge on the polymer colloid particles, pH, other additives or stabilizers, temperature, agitation, addition of desolvating solvents and other effects. Likewise the quantity of different drugs required to produce coagulation of a single polymer emulsion varies widely as does the concentration of electrolyte. The first case above, addition of nondrug electrolyte to accelerate coagulation at low quantity levels of drugs, is the usual cause for adding additional non-drug electrolyte. It is noted that polyvalent cations are most effective in coagulating anionic colloids and, when used, will be present in the final composition. Electrolytes such as magnesium sulfate, sodium phosphate and aluminum chloride have been found particularly effective as coagulants in the practice of the present invention. An anionic polymer latex may also be used to coagulate a cationic polymer latex, and a cationic polymer latex to coagulate an anionic polymer latex.

If the coagulated drug-polymer system is not immediately separated from the liquid phase, only an insignificant quantity of the drug will return to the solution, i.e., become desorbed. Thus, where the reaction product was not separated from the aqueous phase for 72 hours, only a negligible quantity of drug was found to return to the aqueous phase.

The drug-sorption interaction rate between certain drugs and polymers of the present invention is rapid, equilibrium being reached within one-half hour or less at room temperature (about 20° C.). Chemisorption thus appears to occur rapidly, with subsequent desorption occurring, under flocculation conditions, very slowly, if at all, depending upon the concentration of drug and polymer.

The polymers of the polymer emulsion systems found useful in the practice of the present invention exhibit hydration, as evidenced by swelling or solubility characteristics, in the physiological pH range of gastrointestinal juices of fluids at normal body temperatures (37° C.). The solubility rate of a typical polymer exhibiting a delayed or sustained release pattern is shown in table 1.

TABLE I

Rate of Solubility of Latex A*

| Total Hours Immersed | Cumulative % Dissolved | pH of Fluid |
| --- | --- | --- |
| 1 | 7.4 | 1.4 |
| 2 | 7.1 | 1.4 |
| 3 | 7.7 | 2.1 |
| 4 | 7.7 | 2.6 |
| 5 | 11.2 | 5.5 |
| 6 | 60.0 | 6.9 |
| 8 | 100.00 | 7.4 |

*Latex A is an acrylic copolymer containing about 35 percent carboxylic acid functionality. It is available from the Rohm and Haas Company under the Trademark ACRYSOL ASE-75. The latex contains 40 percent solids.

Temperature also does not appear to have any substantial effects on the sorption process itself. Thus the reaction between Latex A and methapyrilene proceeded with equal effectiveness at 4° and at 25° C. By reason of convenience, the process of the invention would normally be carried out at room temperature. However, where the solubility or stability of the drug is a factor, higher or lower temperatures as from 0° C. to 100° C. may be used as appropriate.

The drug-polymer dispersion system which is obtained from the present sorption process may conveniently be separated from the remaining bulk phase or supernatent liquid by conventional processes as described, followed by drying and milling to a granular or fine, free-flowing powder, which can readily be encapsulated or tabletted in oral dosage form or suspended in a liquid vehicle.

Any convenient drying process may be used to obtain the dry product, whether direct heat, vacuum, spray, or the like. It is noted that drying temperatures which exceed the glass point of the polymer serve to densify the polymer-drug system composition. Such densification may have the effect of retarding drug release by reducing effective total release site surfaces.

The sorption process permits efficient use of drugs absorbed from solution. The filtrate remaining following recovery of the flocculate may be reused, with or without the incorporation of additional drug. The efficiency of utilization of drugs, following repeated flocculation of the filtrates remaining from previous flocculate separations without the incorporation of additional drug, is shown by comparative tests to be many times greater by the practice of the present invention. Thus, using maleic acid as the additive acid, the concentration of drug can be reduced from 10 percent to 0.3 percent in only two flocculations. Without the additive acid, at least three, and generally four, flocculations are required to accomplish the same drug recovery.

The addition of a nondrug electrolyte along with the drug and acid to the polymer emulsion may be preferably employed to accelerate the coagulation process, either where low quantity levels of drugs are being entrapped (10 percent or less and usually 2 percent or less drug in final dry polymer-drug product) which will not in and by themselves reach the requisite flocculation value of the polymer emulsion, or where complete drug sorption is not desirable due to the desire to avoid an excessively retarded drug release. Polyvalent cations are most effective in coagulating anionic colloids (Schultz-Hardy Rule) and when used, will, thus, be present in the final composition in a low concentration as a contaminant. Electrolytes, such as magnesium sulfate, sodium phosphate, and sodium chloride, have been found particularly effective for this purpose in the practice of the present invention.

The unusual and desirable characteristics of the present invention are evident from the examples which follow.

Example 1

Aqueous drug solutions were prepared from methapyrilene salts. To 50 ml. portions were added 50 ml. of latex A (defined previously herein) with constant stirring. The resulting mixtures were suction filtered, the filtrates were assayed, and the amount of drug in the filtrate and flocculant were determined. The tests are summarized in table 2.

TABLE 2

| Initial Drug Solution | | % Of Initial Drug | |
| --- | --- | --- | --- |
| | | In Filtrate | In Flocculant |
| Methapyrilene HCL | 0.07 Molar | 45.8 | 54.2 |
| Methapyrilene HCL | 0.08 Molar | 36 | 64 |
| Succinic Acid | 0.08 Molar | | |
| Methapyrilene HCL | 0.08 Molar | 9 | 91 |
| Succinic Acid | 0.08 Molar | | |
| NaOH | 0.08 Molar | | |
| Methapyrilene Succinate | 0.08 Molar | 9 | 91 |

The effect of the dicarboxylic acid or of the dicarboxylate drug salt on the concentration of drug entrapped by the polymer in the presence of the dicarboxylate or dicarboxylic acid compound is apparent. Only about 54 percent of the drug in the 0.07 Molar drug hydrochloride solution was sorbed and swept from solution, while over 90 percent of the drug carboxylate (succinate) was sorbed under the same conditions, except at a higher drug solution concentration (0.08 Molar vs. 0.07 Molar). It should be recognized that the proportion of the initial drug found in the flocculant generally decreases with an increase in the initial drug concentration.

EXAMPLE 2

Following the foregoing procedures, 100 ml. of drug solution were added to 100 ml. of polymer emulsion, the flocculated mass was mixed for 30 minutes at room temperature, and this was followed by vacuum-aided filtration and drying.

Table 3 data shows clearly the chemical affinity between the carboxylic acid drug salts and the polymer, since 80 to 98 percent of the carboxylic acid salts were removed from the drug solution while only about 50 percent of the hydrochloride salt was removed by the flocculation process. The succinate salt had a remarkable affinity for the polymer, and was entrapped with less than 2 percent loss in the case of the 2 percent drug solution. The adipate salt as a 2 percent drug solution failed to flocculate the polymer without employing an added electrolyte, e.g., 5 percent mg. $SO_4$ and the concentration of chlorpheniramine adipate was therefore increased to 5 percent.

TABLE 3

Effect of Acid Anion, upon the Sorption of Chlorpheniramine by Acrysol ASE-75

| Acid Anion Moiety | Initial Conc. of Drug Soln. % w/v | % of Initial Drug Sorbed | % Drug in Dry Flocculant |
| --- | --- | --- | --- |
| Hydrochloride | 2 | 54 | 3.3 |
| Maleate | 2 | 91 | 3.7 |
| Oxalate | 2 | 80 | 3.7 |
| Malonate | 2 | 90 | 3.9 |
| Succinate | 2 | 98 | 4.5 |
| Succinate | 5 | 93 | 10.0 |
| Succinate | 10 | 86 | 17.5 |
| Adipate | 5 | 96 | 10.4 |

EXAMPLE 3

To show the effect of drug salt form and drug concentration, several different drug-acid salt combinations were prepared and flocculated with polymer (Acrysol ASE-75) as

TABLE 4

| Drug salt form and concentration | Suspension media | Percent drug released in hours— 24 | 48 | 120 | Final suspension pH |
| --- | --- | --- | --- | --- | --- |
| Chlorpheniramine salts: | | | | | |
| Succinate 4.3% | S.G.F. | 57 | 62 | 69 | 1.4 |
| | Buffer | 3 | 3 | 3 | 4.1 |
| | S.I.F. | 99 | 97 | | 7.1 |
| Succinate 10% | S.G.F. | 86 | 84 | 84 | 1.4 |
| | Buffer | 12 | 12 | 12 | 4.5 |
| | S.I.F. | 91 | 97 | | 7.4 |
| Succinate 18.9% | S.G.F. | 81 | 83 | 85 | 1.4 |
| | Buffer | 18 | 19 | 21 | 4.9 |
| | S.I.F. | 89 | 94 | | 8.0 |
| Hydrochloride 3.5% | S.G.F. | 38 | 36 | 38 | 1.4 |
| | Buffer | 8 | 8 | 9 | 3.2 |
| | S.I.F. | 66 | 74 | | 6.9 |
| Oxalate 4.3% | S.G.F. | 50 | 56 | 56 | 1.4 |
| | Buffer | 6 | 6 | 6 | 3.8 |
| | S.I.F. | 86 | 92 | | 7.0 |
| Malonate 4.1% | S.G.F. | 62 | 67 | 68 | 1.4 |
| | Buffer | 5 | 5 | 5 | 3.6 |
| | S.I.F. | 88 | 98 | | 7.0 |
| Maleate 3.9% | S.G.F. | 55 | 58 | 67 | 1.4 |
| | Buffer | 5 | 6 | 6 | 3.9 |
| | S.I.F. | 91 | 100 | | 7.0 |
| Adipate | S.G.F. | 82 | 81 | 85 | 1.4 |
| | Buffer | 10 | 10 | 10 | 4.4 |
| | S.I.F. | 92 | 95 | | 7.7 |
| Methapyrilene salts: | | | | | |
| Hydrochloride 3.2% | S.G.F. | 56 | | 65 | 1.8 |
| | Buffer | 7 | | 7 | 4.0 |
| Fumarate 2.5% | S.G.F. | 46 | | 62 | 1.7 |
| | Buffer | 10 | | 8 | 3.6 |
| Succinate 3.3% | S.G.F. | 64 | | 65 | 1.8 |
| | Buffer | 5 | | 3 | 4.3 | described previously. These were then tested for release rate by placing 5 gm. of polymer-drug material in 50 ml. of fluid in a 3-oz. round bottle, which was rotated at 37° for the times specified, prior to assay. The release characteristics are shown in table 4. In the table, "S.G.F." refers to simulated gastric fluid U.S.P., with enzyme omitted; "Buffer" refers to simulated gastric fluid U.S.P., with enzyme omitted; "Buffer" refers to U.S.P. phosphate buffer, pH 4.5 ; and "S.I.F." refers to simulated intestinal fluid U.S.P., with enzyme omitted.

The relationship between drug release and drug concentration in the polymer-drug system is clearly shown by the three chlorpheniramine succinate systems in the phosphate buffer. Ordinarily polymer-drug systems would not be prepared containing more than 10 percent of an antihistamine drug, based on the dose of such drugs. The release data of carboxylic acid drug salts correspond closely to the entrapment data and to the probable order of drug salt affinity for the polymer. The degree of release may be arranged as follows: Adipate, Succinate, Malonate, Maleate, Oxalate and Hydrochloride.

The dialysis release of the polymer-drug system of Acrysol ASE-75 was investigated to determine whether drug would be permanently bound to the polymer. The polymer per se did not dialyze through the semipermeable membrane employed, but the drug did freely dialyze. The dialysis release of the polymer-drug entrapment system was then determined, and the drug was observed to be from 87 percent to 98 percent available for dialysis. In other words, equilibrium dialysis analysis indicated that as little as 2 percent of the entrapped drug, and not more than 13 percent of the drug is permanently bound by the polymer, and would be unavailable for absorption. Thus, for example, a chlorpheniramine maleate-polymer system releases drug at a substantially slower rate in gastric juice than the hydrochloride system even though the maleate drug salt and hydrochloride drug salt may have nearly identical aqueous solubility properties, the concentration of maleate drug salt in the entrapment matrix is higher, and a smaller sample can be used in the release determination. All these factors should cause a more rapid release of chlorpheniramine maleate. The slower release of the chlorpheniramine salt is the result of polymer-drug interaction, which is less pronounced or nonexistent in the case of the hydrochloride.

The dialytic release rates in intestinal fluid are higher for the maleate than for the hydrochloride, but this data is difficult to interpret due to the solubilization of the polymer at the pH of intestinal fluid. The dissolved polymer produces a very viscous solution in the dialysis sacs and probably also tends to block the pores of the membrane.

The effect of the polymer-drug ratio on dialytic release rates is also significant. A chlorpheniramine maleate-polymer product, containing 96.7 percent polymer and only 3.3 percent drug, releases only a fraction of the drug after 24 hours that is released by a 16.7 percent drug product. The polymer-drug ratio appears to be a very useful variable to alter drug release rates.

The dialysis tests illustrate the substantially complete drug availability which can be obtained from this invention Permanent drug binding which would prevent the drug from being available to the body would be undesirable since the drug dosage would have decreased effectiveness.

EXAMPLE 4

To further demonstrate the release of chlorpheniramine maleate from polymer, 5.0 gm. of chlorpheniramine maleate-Acrysol ASE-75 flocculate product, containing 3.7 percent drug, as a 60-mesh undersize powder, was suspended in 100 ml. of vehicle in a 4-oz. reagent bottle. The bottles were shaken vigorously initially and once each day over the test period. The results of the periodically assayed products are given in table 5. The data indicated premature drug leach-out in liquid vehicles is controllable and liquid suspension sustained release products are feasible.

TABLE 5.—RELEASE OF CHLORPHENIRAMINE MALEATE FROM AN ACRYSOL MATRIX IN VARIOUS BUFFERS AND VEHICLES

| Vehicle | pH of freshly prepared suspension | Cumulative percent drug release in days | | | |
|---|---|---|---|---|---|
| | | 2 | 7-8 | 14-15 | 30 |
| Phosphate buffer, pH 4.5 | 4.3 | 2.4 | 2.5 | 2.3 | 3.6 |
| Phosphate buffer, pH 6.0 | 5.6 | 0 | 3.8 | 4.2 | 3.6 |
| Phosphate buffer, pH 8.0 | 6.1 | 32.3 | 42.4 | 45.3 | 60.0 |
| Orange syrup U.S.P | 2.4 | 1.6 | 2.0 | 2.4 | 2.7 |
| 1% citric acid solution | 2.3 | 11.7 | 23.1 | 27.0 | 35.4 |
| Distilled water, continuously stirred for 30 days with magnetic stirrer | 3.3 | 6.4 | 7.1 | 7.5 | 9.6 |
| Distilled water | 3.3 | 4.6 | 6.2 | 6.8 | 7.0 |
| Standard soln. 200 mg. dry drug-maleate per 100 ml. of water | 4.5 | 100 | 100 | 100 | 100 |

As is shown, drug release is retarded between pHs of about 2.5 and 5.6 to 6. Continuous stirring of a distilled water suspension over a 30-day period produced no increased release over a similar suspension which was only shaken daily. Release thus is a controllable factor.

EXAMPLE 5

Sorption Of An Antihistamine Dicarboxylic Acid Drug Salt

In a further example, 2 g. of chlorpheniramine succinate is mixed in 50 ml. of water and stirred constantly. To this mixture is added 50 ml. of an acrylic-acrylate copolymer emulsion (Acrysol ASE-75)—(a carboxyl to ester ratio of about 2:5) over a 10-minute period at room temperature. The flocculated mixture is then stirred for approximately 30 minutes, filtered with suction and dried. The dried flocculate and filtrate were then assayed for drug content. It was found that the amount of drug in the filtrate (not entrapped) was 1.7 percent and the amount of drug in the flocculant (entrapped) was 98.3 percent of that originally present. The product may be encapsulated or directly tabletted to produce a sustained release product, or suspended for a liquid product.

EXAMPLE 6

Sorption of a Drug Hydrochloride in the Presence of a Dicarboxylic Acid and an Equimolar Quantity of Base

| Ingredients | Amount |
|---|---|
| Phenylephrine hydrochloride | 5.0 g. |
| Maleic acid | 1.6 g. |
| Sodium hydroxide | 1.0 g. |
| Distilled water | 50.0 ml. |
| Neocryl BT4—(Anionic Acrylic Copolymer emulsion) | 50.0 ml. |

The phenylephrine, maleic acid and sodium hydroxide are dissolved in 50 ml. of water at 25°, and added slowly (within about one-half minute) with constant stirring to the polymer emulsion (also at 25°), Neocryl BT4. The resulting product is filtered and dried. The presence of the sodium hydroxide is to promote solubility and ionization of the dicarboxylic acid in the drug solution. The product can be made into a sustained-release suspension in the following manner:

| Ingredients | Amount |
|---|---|
| Phenylephrine product | 1.00 g. |
| Glycerin | 10.00 ml. |
| Sodium Carboxymethylcellulose | 2.00 g. |
| Methyl paraben | 0.0625 g. |
| Propyl paraben | 0.0125 g. |
| Sugar syrup, U.S.P. | 50.0 ml. |
| Imitation cola flavor | 0.1 ml. |
| Soluble lemon-lime flavor | 0.03 ml. |
| Purified water, U.S.P. q.s. | 100.00 ml. |

The parabens are dissolved in the glycerin with the aid of heat and the sodium carboxymethylcellulose added to the glycerin solution. The glycerin mixture is then added to a water-syrup-phenylephrine mixture and stirred until evenly suspended. The flavors are added and the suspension brought to the desired volume by addition of sufficient water.

EXAMPLE 7

Sorption of Drug Hydrochloride in the Presence of Monocarboxylic Acid

| Ingredients | Amount |
|---|---|
| Phenylpropanolamine Hydrochloride | 20.0 gm. |
| Acetic Acid | Equimolar Quantity |
| Purified Water U.S.P. | 100.00 ml. |
| Acrysol ASE 75 | 100.0 ml. |

The drug is dissolved in the water at room temperature (25°), the acid added and this solution rapidly combined (poured directly together within 15–20 seconds) with the polymer emulsion, also at 25°, with stirring. The resulting flocculate is suction filtered and oven dried at 37° C. The resulting product contained 9.7 percent drug and provided a sustained release in man corresponding to a biological half-life determined by urinary excretion, averaging 8.5 hours. The average biological half-life of the control, i.e., nonentrapped, unmodified U.S.P. drug hydrochloride was 4.7 hours.

EXAMPLE 8

Data for a straight nondialytic solubility release of a chlorpheniramine maleate-polymer system were obtained as a function of particle size. Half gram samples of each polymer-drug particle size fraction were placed in either 50 ml. of gastric or 50 ml. of intestinal fluid, and were rotated and assayed at the times specified. Table 6 illustrates that the particle size has little effect on release rate.

TABLE 6

Equilibrium Solubility Release of Chlorpheniramine Maleate from an Acrysol ASE-75 Flocculant System (4.1% drug) in Test Media as a Function of Particle Size

| Particle Size (Sieve Fraction) | % Drug Released in 24 Hrs. | | % Released in 96 Hrs. at pH of 1.2 |
|---|---|---|---|
| | at pH 1.2 | at pH 7.4 | |
| 30 Mesh oversize | 62 | 91.5 | 67 |
| 30/40 Mesh | 65 | 92.0 | 70 |
| 40/60 | 67 | 91.0 | 72 |
| 60/120 | 69 | 92.5 | 75 |
| 120/170 | 71 | 90.5 | 75 |
| 170/230 | 75 | 92.5 | 80 |
| 230 Undersize | 77 | 91.0 | 80 |

Even though there is a promoted sorption, binding and entrapment of the carboxylic acid drug salt by the polymer, 90 percent or more of the drug was available in intestinal fluid in the in-vitro test, and particle size has a small effect on equilibrium solubility of the sieve fractions in gastric media, but not in intestinal media.

EXAMPLE 9

Entrapment of a Soluble and an Insoluble Salt Form of the Same Drug

| Ingredients | Amount |
| --- | --- |
| Chlorpheniramine Pamoate (insoluble Salt) | 2.0 g. |
| Chlorpheniramine Succinate (Soluble Salt) | 2.0 g. |
| Water, Purified | 100.0 ml. |
| Neocryl BT4 Charge | 100.0 ml. |

Disperse the pamoate salt in the polymer emulsion, dissolve the succinate salt in the water, and add the polymer emulsion system slowly to the aqueous solution with stirring. Separate the coagulated material by filtration, dry and grind to size. The Chlorpheniramine Pamoate is mechanically and grossly entrapped; the Chlorpheniramine Succinate is ionic to molecular scale entrapped. The release rate (dissolution release rate) in gastric fluid of the resulting product is between 33 percent and 50 percent slower than that observed in the polymer drug product containing only the soluble Chlorpheniramine Succinate salt at the same concentration level.

Polymer emulsions in cross-linked form are also commercially available—some of which contain residual COOH groups, Examples:

| Product | % Solids | % COOH on Solids |
| --- | --- | --- |
| Acrysol ASE-60 | 27.7 | 21 |
| Acrysol 108 | 20.0 | 36 |

(Products of Rohm and Haas Co.)

So called self-crosslinking polymers such as X-Link 2802, sold by National Starch and Chem. Corp., N.Y., N.Y., are also commercially available—which have been found useful in the practice of the present invention. Use of such materials is illustrated by the following example.

EXAMPLE 10

| Ingredients | Amount |
| --- | --- |
| Pyrilamine Maleate | 100 g. |
| Magnesium Sulfate | 50 g. |
| Purified Water | 750 ml. |
| Acrysol ASE-60 | 2,000 ml. |
| (Modified acrylic, partially crosslinked, anionic polymer emulsion, 28 percent w/w solids, pH 3.5, Rohm and Haas Co.). | |

Dissolve the first two ingredients in the water, add slowly with stirring to the polymer emulsion, separate, dry and mill.

In the following examples, all of the component except the polymer are first dissolved in water, the resulting solution is added slowly with stirring to the polymer emulsion, and the flocculate is separated by vacuum filtering, dried at 50° C. and milled to size.

EXAMPLE 11

| Ingredients | Amount |
| --- | --- |
| Atropine Sulfate | 10 g. |
| Malonic Acid | 20 g. |
| Magnesium Sulfate | 15 g. |
| Distilled Water | 200 ml. |
| Acrysol ASE-95 | 500 ml. |
| (Modified acrylic polymer emulsion, 20 percent solids w/w, pH 3.0, Rohm and Haas Co.). | |

EXAMPLE 12

Sorption of an Amphoteric Drug (Hydrochloride Salt Form) Facilitated by Dicarboxylic Acid employing Polymer Emulsion

| Ingredients | Amount |
| --- | --- |
| Oxytetracycline Hydrochloride | 250 g. |
| Succinic Acid | 120 g. |
| Sodium Hydroxide | 40 g. |
| Water | 2,000 ml. |
| Emulsion 4-E J S-35 | 2,000 ml. |
| (An anionic polymer emulsion composed of ethyl acrylate and acrylic acid in a 60:40 ratio). | |

EXAMPLE 13

Sorption of an Amphoteric Drug (Sodium Salt Form) Facilitated by a Dicarboxylic Acid Employing a Polymer Emulsion

| Ingredients | Amount |
| --- | --- |
| Oxytetracycline Disodium Salt Dihydrate | 100 g. |
| Maleic Acid | 50 g. |
| Water | 600 ml. |
| Acri-Flo 150 | |
| (A styrene-acrylic nonionic polymer emulsion, Chemical Division of General Tire and Rubber Co., Akron, Ohio). | |

EXAMPLE 14

Sorption of Anionic Drug by a Polymer with the Aid of a Difunctional Cation

| Ingredients | Amount |
| --- | --- |
| Phenobarbital | 150 g. |
| Aminoacetic acid | 50 g. |
| Purified Water | 800 ml. |
| Rhoplex AC-200 | 1,000 ml. |
| (Modified acrylic, nonionic polymer emulsion, 46 percent solids, w/w, pH 9-10). | |

In a series of in vivo tests on human subjects, the phenylpropanolamine acetate-polymer product of example 7 was utilized and compared with U.S.P. phenylpropanolamine suspended in simple syrup. The effective drug dosage was 50 mg. in each instance. The duration of effectiveness for the drug-polymer product was almost twice that of the U.S.P. drug, with an average urinary excretion half-time of 8 hours for the former as compared to 4¾ hours for the latter. Additionally, substantially more variations in drug availability and elimination was observed with the U.S.P. drug.

Tabletting the polymer-drug product reduces release rates, provides an additional means of controlling release, and permits the use of higher drug concentrations while retaining satisfactory release rates. The dissolution of the resultant tablets can be made to occur at various time intervals; with excellent uniformity in percent of hourly drug release.

As exemplified, drug release in a gastric environment can also be controlled by the use of a combination of soluble and insoluble drug salts. To reduce the percentage of drug released in gastric contents a higher ratio of insoluble to soluble drug salt may be employed. All of the drug will be physiologically available in the intestinal environment due to the gradual but complete solubility of the polymer in that environment.

In the final product of the present invention, the carboxylic acid-drug combination is evenly distributed throughout the polymer matrix, the drug remained associated to the polymer without alteration after high-speed milling in a comminuter, and is contained in the various particle size fractions in the same concentration. This is a further advantage of the invention and suggests other applications for the invention. Polymer matrices used as diluents permit the preparation of drug or other active ingredient dilutions, in a level of uniformity not achievable in standard powder mixtures. The various particle size fractions of the entrapped active ingredient-polymer systems are identical in percentage composition of the active ingredient. This in not the case, for standard powder dilutions, where it is a rule of powder mixing technology that the active ingredient and excipient diluent have approximately the same particle size. Even this does not insure a uniform powder dilution since surface charges, electrostatic effects or other physicochemical phenomena may prevent the preparation of uniform distribution powder dilutions. These problems are avoided when this invention is used to provide molecular to ionic scale dispersion (not possible in powder mixtures) of active ingredients throughout a polymeric vehicle.

By the present invention, drug is found to be present in the resulting dried polymer flocculant from about 0.5 percent or less, to about 60 percent. No lower limit has been found for the level of drug concentration which may be uniformly sorbed based on the molecular-to-ionic scale of drug sorption which is a fundamental principle and basic advantage of this method. Levels of drug concentration of 0.001 percent and less have been uniformly and successfully sorbed, with or without coagulation of the polymer colloid being employed to extract the polymer. At levels of drug concentration below about 3 to 10 percent in the dry polymer-drug system, it is possible, depending on the flocculation value of the drug and on the stability of the polymer colloid, to sorb drug without flocculating the system. To obtain a dry polymer-drug system, in such cases, ultracentrifugation, freezing or other mechanical means may be used to separate the polymer from the bulk phase, followed by drying.

It will therefore, be appreciated that, depending on the comonomer composition of the polymer emulsion and its functionality, particularly its pendant carboxyl content and presence of other readily hydrated groups, the nature of the drug, and its concentration in the final polymer-drug system product, together with other readily controllable physicochemical factors, and particularly on the selected carboxylic acid added to the system, products and dosage forms may be produced with the present invention containing molecularly sorbed, trapped and dispersed drug for any of the following purposes:

1. Provision of true sustained release of the drug displaying a smooth eight-hour or longer release pattern which yields therapeutic activity times of 8 to 12 hours, with reduced toxicity,
2. provision of delayed or enteric drug release, with little to no drug released in the stomach and the remaining drug released in the intestinal tract,
3. Masking of objectionable-tasting drugs, reduction of objectionable drug odors, prevention of numbing or other local drug effects on oral mucosa, and reduction or elimination of nausea caused by drugs irritating to the stomach,
4. Reduction or prevention of physical and/or chemical incompatibilities between drugs or other chemicals by the effective molecular scale entrapment of one of the reactants.
5. Reduction of drug toxicity properties and improvement of drug safety.
6. Preparation of highly uniform dispersions of minute quantities of drug based on the molecular to ionic scale of distribution and mixability.

From the foregoing it will be appreciated that it has been discovered that the number of chemisorption sites on certain polymers, or polymer emulsions, the presence of other coagulating electrolyte in the drug solution (especially polyvalent cations), are variables which may either promote or hinder drug sorption to the polymer colloid, influencing and controlling both the entrapment of the drug and its subsequent dissolution and release from the drug-polymer system. Such control is a highly advantageous feature of the invention since it permits the design of products to release drug or other types of materials very slowly, rapidly initially plus continuously with a slower-release fraction, or at an intermediate rate, according to the purpose of the intended final product. The aforementioned variables controlling sorption and release are physical or chemical in nature and in their mechanism of action on the process, and may be precisely controlled. Other factors such as temperature, rate or mixing during polymer-drug combination, length of time lapse between interaction and separation of coagulated polymer, have not been found to have a substantial effect on the results or uniformity of the results. This is a clear-cut and demonstrated advantage over known pharmaceutical coating methods as well as over other more analytical known approaches to drug and chemical inclusion, entrapment or binding.

The process described herein is superior to other chemisorption processes, such as ion exchange, in that the polymer in this process is in a maximum state of dispersion, fine particle size, maximum surface and high concentration, and the resulting sorption process is consequently much more rapid, reliable and efficient.

The process of this invention is unlike simple ion exchange in that it involves both sorption and entrapment, the latter resulting from the coagulation process. The polymers used by this process are unlike those commonly used in pure chemisorption methods, such as ion exchange, in that the polymers are soluble or are hydrated at physiological pHs. Since the polymers employed by the process are not inert under gastrointestinal conditions, more complete drug release is assured than when inert polymers depending on drug leach-out for release are employed.

Although minor modifications and alterations of the present invention will become readily apparent to those versed in the art, it should be understood that what is intended to be encompassed within the scope of the patent warranted hereon are all such embodiments as reasonably and properly come within the scope of the contribution to the art hereby made.

It will be recognized from the examples and discussion that the polyfunctional acids, e.g., glycine, adipic acid, and the like, and particularly the polycarboxylic acids, e.g., succinic acid, etc., are preferred. These are capable of serving both as protective electrolytes and as bridging anions in improving the pharmaceutical products. The monofunctional acids, e.g., acetic acid, while providing improvement, are not able to provide the bridging effect which contributes so significantly to the present invention.

What is claimed is:

1. In a process for the preparation of a pharmaceutical composition in a dosage form having controlled release wherein a drug is sorbed on polymer particles in an aqueous latex by a process which comprises the steps of:
   a. providing an aqueous latex of dispersed particles of at least one physiologically harmless member selected from the group consisting of polymers having acidic functionality, polymers having basic functionality, and polymers having both acidic and basic functionality, said selected member being hydratable in the gastrointestinal tract, said polymer being a preformed product of emulsion polymerization;
   b. providing a dispersion of a pharmaceutically active drug, said drug being at least partially soluble in the dispersing medium, said dispersing medium being compatible with said aqueous latex;

c. intermixing said latex and said drug dispersion to effect sorption of said drug to said polymer particles;

d. separating the particulate sorption product of step (c); and e. formulating said sorption product into an oral dose form, the improvement which comprises effecting said sorption in the presence of a physiologically harmless, at least partially dissolved in the dispersing medium of said aqueous latex, said acid selected from the group consisting of acetic acid, aminoacetic acid, polycarboxylic aliphatic acids, citric acid, tartaric acid, ascorbic acid, and the phthalic acids with the proviso that if the polymer contains only acidic groups, the drug most contain basic groups and if the polymer contains only basic groups and the carboxylic acid is monocarboxylic, the drug must contain acidic groups 2. A process in accordance with claim 1 wherein said acid is polycarboxylic.

3. A process in accordance with claim 1 wherein said acid is a water-soluble, aliphatic dicarboxylic acid.

4. A process in accordance with claim 1 wherein said carboxylic acid is selected from the group consisting of acetic acid, glycine, oxalic acid, malonic acid, succinic acid, glutaric acid, adipic acid, maleic acid, fumaric acid, citric acid, tartaric acid, ascorbic acid, and the phthalic acids.

5. An oral dosage pharmaceutical composition produced in accordance with the process of claim 6, characterized by controlled release comprising a pharmaceutically active acidic or basic drug or a drug that it both acidic and basic chemisorbed on the molecular-to-ionic scale in an aqueous dispersing medium in which said drug is at least partially soluble to latex particles of a physiologically harmless basic or acidic polymer or a polymer that is both acidic and basic that is hydratable in the gastrointestinal tract, said polymer being a preformed product of emulsion polymerization and sufficiently functionally reactive to chemisorb said drug on the molecular-to-ionic scale whereby the major portion of the drug is available for dialysis, and only a minor portion of the drug is permanently bound by the polymer and is unavailable for gastrointestinal absorption, and further containing a substantial amount of physiologically harmless, at least slightly water-soluble, carboxylic acid selected from the group consisting of acetic acid, aminoacetic acid, polycarboxylic aliphatic acids, citric acid, tartaric acid, ascorbic acid, and the phthalic acids chemisorbed from the aqueous dispersing medium in which said acid is at least partially dissolved with said drug to said latex particles, said composition exhibiting more prolonged release at a buffered pH of 4.5 than the composition free of said acid.

6. A composition in accordance with claim 5 wherein said carboxylic acid is selected from the group consisting of acetic acid, glycine, oxalic acid, malonic acid, succinic acid, glutaric acid, adipic acid, maleic acid, fumaric acid, citric acid, tartaric acid, ascorbic acid, and the phthalic acids.

7. A composition in accordance with claim 5 wherein said acid is polyfunctional.

8. A composition in accordance with claim 7 wherein said acid is polycarboxylic.

9. A composition in accordance with claim 5 wherein said acid is a water-soluble, aliphatic dicarboxylic acid.

10. A composition in accordance with claim 5 wherein said polymer is an acrylic polymer leaving acid functionally and said drug is a basic drug containing a basic nitrogen group.

UNITED STATES PATENT OFFICE
CERTIFICATE OF CORRECTION

Patent No. 3,608,063    Dated September 21, 1971

Inventor(s) Gilbert S. Banker

It is certified that error appears in the above-identified patent and that said Letters Patent are hereby corrected as shown below:

In line 23 of claim 1 (line 9 of Col. 17), immediately following "harmless," insert -- at least slightly water-soluble, carboxylic acid --

In line 2 of claim 10 (line 31 of Col. 18) change "leaving" to -- having -- and change "functionally" to -- functionality --.

Signed and sealed this 16th day of May 1972.

(SEAL)
Attest:

EDWARD M. FLETCHER, JR.
Attesting Officer

ROBERT GOTTSCHALK
Commissioner of Patents